US012779823B2

(12) United States Patent
Pleiman et al.

(10) Patent No.: US 12,779,823 B2

(45) Date of Patent: Nov. 3, 2026

(54) DURABLE GLASS WINDSHIELDS WITH REDUCED OPTICAL DISTORTION, METHODS FOR THEIR PRODUCTION, AND METHODS FOR PRODUCING PANELS THEREFOR

(71) Applicant: Auto Temp, Inc., Batavia, OH (US)

(72) Inventors: Thomas J. Pleiman, Lebanon, OH (US); Frank Lauch, Cincinnati, OH (US)

(73) Assignee: AUTO TEMP, INC., Batavia, OH (US)

(*) Notice: Subject to any disclaimer, the term of this patent is extended or adjusted under 35 U.S.C. 154(b) by 0 days.

(21) Appl. No.: 18/987,707

(22) Filed: Dec. 19, 2024

(65) Prior Publication Data

US 2025/0206000 A1 Jun. 26, 2025

Related U.S. Application Data

(63) Continuation-in-part of application No. PCT/US2024/055371, filed on Nov. 11, 2024.

(Continued)

(51) Int. Cl.

| | |
|---|---|
| ***B32B 17/10*** | (2006.01) |
| ***B32B 3/26*** | (2006.01) |
| ***B32B 7/022*** | (2019.01) |

(52) U.S. Cl.

CPC ........ *B32B 17/10091* (2013.01); *B32B 3/266* (2013.01); *B32B 7/022* (2019.01);

(Continued)

(58) Field of Classification Search

CPC ......... B32B 3/263; B32B 3/266; B32B 7/022; B32B 17/10091; B32B 17/10568;

(Continued)

(56) References Cited

U.S. PATENT DOCUMENTS

| | | | | |
|---|---|---|---|---|
| 4,075,381 A | 2/1978 | Furukawa et al. | | |
| 2004/0200821 A1* | 10/2004 | Voeltzel | .................. | H05B 3/86 219/203 |

(Continued)

FOREIGN PATENT DOCUMENTS

| | | | |
|---|---|---|---|
| EP | 2660045 A1 * | 11/2013 | ....... B32B 17/10036 |
| WO | WO-2017019851 A1 * | 2/2017 | ....... B32B 17/10036 |
| WO | 2023275806 A1 | 1/2023 | |

OTHER PUBLICATIONS

Interpretation from NHSTA. Obtained from https://www.nhtsa.gov/interpretations/aiam4542 on Apr. 8, 2025. Published Sep. 12, 1988. (Year: 1988).*

(Continued)

*Primary Examiner* — Megha M Gaitonde

(74) *Attorney, Agent, or Firm* — Firm Foundation IP LLC

(57) ABSTRACT

Durable glass windshields with high optical transmittance, methods for their production, and methods for producing panels therefore are provided herein. Methods for producing durable glass windshields include heat-strengthening raw glass at elevated temperature followed by rapid cooling of the heat-treated glass. Durable glass windshields produced according to methods outlined herein have strength exceeding annealed glass with visibility meeting standards for use in windshields, such as the AS1 standard.

49 Claims, 5 Drawing Sheets

Related U.S. Application Data

(60) Provisional application No. 63/614,041, filed on Dec. 22, 2023.

(52) U.S. Cl.
CPC .. *B32B 17/10036* (2013.01); *B32B 17/10761* (2013.01); *B32B 2307/54* (2013.01); *B32B 2307/7376* (2023.05); *B32B 2605/00* (2013.01)

(58) Field of Classification Search
CPC ........ B32B 17/10036; B32B 17/10761; B32B 17/10779; B32B 17/10587; B32B 17/1055; B32B 27/22; B32B 27/30; B32B 27/08; B32B 27/306; B32B 2307/54; B32B 2315/08; B32B 2329/06; B32B 2605/00; B32B 2605/006; B32B 2605/08; C08J 5/18; C08J 2329/14; G02B 2027/012; G02B 27/01; B60J 1/001; B60J 1/02; B60K 2370/1529; Y10T 428/24479; Y10T 428/24612; Y10T 428/24942; Y10T 428/2495; Y10T 428/24959
USPC ......................... 428/156, 172, 212, 213, 214
See application file for complete search history.

(56) References Cited

U.S. PATENT DOCUMENTS

| | | | | |
|---|---|---|---|---|
| 2015/0306848 | A1* | 10/2015 | Anderson | B32B 17/10137 428/501 |
| 2017/0150628 | A1* | 5/2017 | Amin | B32B 17/1077 |
| 2018/0244135 | A1* | 8/2018 | Luo | B60J 1/02 |
| 2020/0376815 | A1 | 12/2020 | Mannheim Astete et al. | |
| 2023/0120203 | A1 | 4/2023 | Mimoun | |

OTHER PUBLICATIONS

Rodriquez, Kari, International Search Report and Written Opinion from the PCT/US2024/055371 with a filing date of Nov. 11, 2024, 11 pages, Jan. 17, 2025, International Searching Authority of the PCT, United States Patent & Trademark Office, Alexandria, VA, US.

* cited by examiner

DURABLE GLASS WINDSHIELDS WITH REDUCED OPTICAL DISTORTION, METHODS FOR THEIR PRODUCTION, AND METHODS FOR PRODUCING PANELS THEREFOR

CROSS-REFERENCE TO RELATED APPLICATIONS

This application is a continuation in part of International Patent Application No. PCT/US2024/055371, filed on Nov. 11, 2024, and claims the benefit of U.S. Provisional Application Ser. No. 63/614,041, filed Dec. 22, 2023 and entitled TEMPERATURE CONTROLLED WINDSHIELD, the entire contents of each is incorporated herein by reference.

FIELD OF INVENTION

The field of invention is for windshields methods for their production, more specifically windshields with reduced optical distortions while still meeting AS1 standards.

BACKGROUND

Specialty vehicles, such as utility terrain vehicles ("UTV"), are often used in applications that result in exposure to environments that ordinary automotive vehicles are not properly equipped to handle. For example, specialty vehicles are subjected to higher temperatures (up to 150° F.) and greater temperature fluctuations than conventional vehicles typically experience. Specialty vehicles are also often driven in off road environments where rugged terrain, debris, and severe weather are more common. Accordingly, windshields for these specialty vehicles need to be able to withstand unusually high stresses from exposure to extreme temperatures, rapid temperature fluctuations, rough terrain, debris (sand, bugs, branches, rocks, etc.), severe weather, and other harsh conditions, without failure (e.g., cracking, penetration, etc.). However, ordinary automotive windshields are not able to handle without cracks and failure.

Glass used in windshields must meet more strict requirements than glass used for other portions of the vehicle, such as side window glass. In the United States, windshield glass must meet the requirements of the AS1 standard, whereas other glass in the vehicle need only meet the less strict requirements of the AS2 standard. Specifically, AS1 glass must pass all tests required of the AS2 standard and further pass additional tests 15 (which tests optical deviation) and 26 (which tests penetration).

In one embodiment of the second aspect of the invention, further including at least one of the following: during heating the raw glass outer windshield panel, measuring the temperature of the raw glass outer windshield panel; and during heating the raw glass inner windshield panel, measuring the temperature of the raw glass inner windshield panel. In a further embodiment thereof, the method further includes during heating the raw glass outer windshield panel, measuring the temperature of the raw glass outer windshield panel. In an alternate further embodiment thereof, the method further includes during heating the raw glass inner windshield panel, measuring the temperature of the raw glass inner windshield panel. In a yet further alternate embodiment thereof, the method further includes both during heating the raw glass outer windshield panel, measuring the temperature of the raw glass outer windshield panel; and during heating the raw glass inner windshield panel, measuring the temperature of the raw glass inner windshield panel.

In one embodiment of the second aspect of the invention, heating the raw glass outer windshield panel and heating the raw glass inner windshield panel occurs simultaneously in a single furnace.

In one embodiment of the second aspect of the invention, at least one of the second temperature and the fourth temperature is less than or equal to 510° C. In a further embodiment thereof, the second temperature is less than or equal to 510° C. In an alternate further embodiment thereof, the fourth temperature is less than or equal to 510° C. In a yet further alternate embodiment thereof, both the second temperature and the fourth temperature are less than or equal to 510° C.

In one embodiment of the second aspect of the invention, at least one of the second temperature and the fourth temperature is well below 510° C. In a further embodiment thereof, the second temperature is well below 510° C. In an alternate further embodiment thereof, the fourth temperature is well below 510° C. In a yet further alternate embodiment thereof, both the second temperature and the fourth temperature are well below 510° C.

In one embodiment of the second aspect of the invention, at least one of the first cooling rate and the second cooling rate is less than or equal to 30° C./second. In a further embodiment thereof, the first cooling rate is less than or equal to 30° C./second. In an alternate further embodiment thereof, the second cooling rate is less than or equal to 30° C./second. In a yet further alternate embodiment thereof, both the first cooling rate and the second cooling rate are less than or equal to 30° C./second.

In one embodiment of the second aspect of the invention, at least one of the first cooling rate and the second cooling rate is estimated by measuring the stress within the heat-treated glass windshield panel after the cooling process. In a further embodiment thereof, the first cooling rate is estimated by measuring the stress within the heat-treated glass windshield panel during the cooling process. In an alternate further embodiment thereof, the second cooling rate is estimated by measuring the stress within the heat-treated glass windshield panel during the cooling process. In a yet further alternate embodiment thereof, both the first cooling rate and the second cooling rate are estimated by measuring the stress within the heat-treated glass windshield panel during the cooling process.

In one embodiment of the second aspect of the invention, steps for cooling the heat-treated glass outer windshield panel and cooling the heat-treated glass inner windshield panel are performed separately for each windshield panel.

In one embodiment of the second aspect of the invention, the method further includes, prior to cooling the heat-treated outer windshield panel, bending the heat-treated outer windshield panel into a shape configured for use in a specialty vehicle windshield; and, prior to cooling the heat-treated inner windshield panel, bending the heat-treated inner windshield panel into a shape configured for use in a specialty vehicle windshield. In a further embodiment thereof, steps for bending the heat-treated glass outer windshield panel and bending the heat-treated glass inner windshield panel are performed separately for each windshield panel.

In one embodiment of the second aspect of the invention, the method further includes, prior to heating a raw glass outer windshield panel and prior to heating a raw glass inner windshield panel, adding at least one hole to the raw glass inner windshield panel, the raw glass outer windshield panel, and the polymeric material layer, wherein each hole is positioned in substantially the same portion of each of the inner windshield panel, outer windshield panel, and polymeric material layer such that each hole is substantially aligned when the laminated windshield is made.

In one embodiment of the second aspect of the invention, the method further includes, during at least one of heating the raw glass inner windshield panel or heating the raw glass outer windshield panel, monitoring the glass using a single point light source monitoring method to determine roller wave distortion and edge warp distortion. In a further embodiment thereof, the method further includes, during heating the raw glass inner windshield panel, monitoring the glass using a single point light source monitoring method to determine roller wave distortion and edge warp distortion. In an alternate further embodiment thereof, the method further includes, during heating the raw glass outer windshield panel, monitoring the glass using a single point light source monitoring method to determine roller wave distortion and edge warp distortion. In an alternate further embodiment thereof, the method further includes, during both heating the raw glass inner windshield panel or heating the raw glass outer windshield panel, monitoring the glass using a single point light source monitoring method to determine roller wave distortion and edge warp distortion.

In a third aspect of the invention, a laminated windshield that meets or exceeds the AS1 standard is provided, the windshield including: an outer windshield panel comprising heat-strengthened glass; an inner windshield panel comprising heat-strengthened glass; and a polymeric material layer positioned between the outer windshield panel and the inner windshield panel.

In one embodiment of the third aspect of the invention, the tensile strength of at least one of the outer windshield panel and the inner windshield panel is greater than or equal to 3500 PSI. In a further embodiment thereof, the tensile strength of the outer windshield panel is greater than or equal to 3500 PSI. In an alternate further embodiment thereof, the tensile strength of the inner windshield panel is greater than or equal to 3500 PSI. In an alternate further embodiment thereof, the tensile strength of both the outer windshield panel and the inner windshield panel is greater than or equal to 3500 PSI.

In one embodiment of the third aspect of the invention, the tensile strength of at least one of the outer windshield panel and the inner windshield panel is less than or equal to 7500 PSI. In a further embodiment thereof, the tensile strength of the outer windshield panel is less than or equal to 7500 PSI. In an alternate further embodiment thereof, the tensile strength of the inner windshield panel is less than or equal to 7500 PSI. In an alternate further embodiment thereof, the tensile strength of both the outer windshield panel and the inner windshield panel is less than or equal to 7500 PSI.

In one embodiment of the third aspect of the invention, the compressive strength of at least one of the outer windshield panel and the inner windshield panel is greater than or equal to 3500 PSI. In a further embodiment thereof, the compressive strength of the outer windshield panel is greater than or equal to 3500 PSI. In an alternate further embodiment thereof, the compressive strength of the inner windshield panel is greater than or equal to 3500 PSI. In an alternate further embodiment thereof, the compressive strength of both the outer windshield panel and the inner windshield panel is greater than or equal to 3500 PSI.

In one embodiment of the third aspect of the invention, the compressive strength of at least one of the outer windshield panel and the inner windshield panel is less than or equal to 7500 PSI. In a further embodiment thereof, the compressive strength of the outer windshield panel is less than or equal to 7500 PSI. In an alternate further embodiment thereof, the compressive strength of the inner windshield panel is less than or equal to 7500 PSI. In an alternate further embodiment thereof, the compressive strength of both the outer windshield panel and the inner windshield panel is less than or equal to 7500 PSI.

In one embodiment of the third aspect of the invention, the tensile strength of at least one of the outer windshield panel and inner windshield panel is greater than or equal to 3500 PSI and less than or equal to 5000 PSI. In a further embodiment thereof, the tensile strength of the outer windshield panel is greater than or equal to 3500 PSI and less than or equal to 5000 PSI. In an alternate further embodiment thereof, the tensile strength of the inner windshield panel is greater than or equal to 3500 PSI and less than or equal to 5000 PSI. In an alternate further embodiment thereof, the tensile strength of both the outer windshield panel and the inner windshield panel is greater than or equal to 3500 PSI and less than or equal to 5000 PSI.

In one embodiment of the third aspect of the invention, the compressive strength of at least one of the outer windshield panel and inner windshield panel is greater than or equal to 3500 PSI and less than or equal to 5000 PSI. In a further embodiment thereof, the compressive strength of the outer windshield panel is greater than or equal to 3500 PSI and less than or equal to 5000 PSI. In an alternate further embodiment thereof, the compressive strength of the inner windshield panel is greater than or equal to 3500 PSI and less than or equal to 5000 PSI. In an alternate further embodiment thereof, the compressive strength of both the outer windshield panel and the inner windshield panel is greater than or equal to 3500 PSI and less than or equal to 5000 PSI.

In one embodiment of the third aspect of the invention, the polymeric material layer comprises a material selected from the list consisting of vinyl, polyvinyl butyral, thermoplastic polyurethane, ethylene-vinyl acetate, or a combination thereof. In a further embodiment thereof, the polymeric material layer comprises polyvinyl butyral. In a yet further embodiment of the third aspect of the invention, the polymeric material layer is polyvinyl butyral.

In one embodiment of the third aspect of the invention, the laminated windshield has at least one hole. In a further embodiment thereof, each of the at least one hole is configured to receive a windshield wiper. In an alternate further embodiment thereof, each of the at least one hole is configured to receive at least one fastener configured to mount the windshield to the vehicle. In an alternate further embodiment thereof, each of the at least one hole is configured to enable ventilation of the windshield.

In one embodiment of the third aspect of the invention, the windshield is configured for use in a utility terrain vehicle.

In one embodiment of the third aspect of the invention, the windshield has a thickness greater than or equal to 4 mm and less than or equal to 10 mm.

In one embodiment of the third aspect of the invention, the windshield has a thickness substantially equal to 6.16 mm.

In one embodiment of the third aspect of the invention, the windshield has a thickness substantially equal to 6.55 mm.

In one embodiment of the third aspect of the invention, at least one of the outer windshield panel and the inner windshield panel has a thickness greater than or equal to 1.8 and less than or equal to 4 mm.

In one embodiment of the third aspect of the invention, at least one of the outer windshield panel and inner windshield panel is heat strengthened by heating a raw glass windshield panel to a first temperature. In one such embodiment, the first temperature is greater than or equal to 610° C. and less than or equal to 630° C. In an alternate embodiment, the first temperature is greater than or equal to 618° C. and less than or equal to 622° C.

In one embodiment of the third aspect of the invention comprising the heat strengthening of glass as described above, the at least one outer windshield panel or inner windshield panel is cooled to a second temperature after the heating process. In one such embodiment, the second temperature is less than or equal to 510° C. Optionally, cooling the windshield panel may happen at a cooling rate. In one such embodiment, the cooling rate is less than or equal to 30° C./second.

In one embodiment of the third aspect of the invention, the windshield further comprises a silkscreen portion. In one such embodiment, the silkscreen portion is positioned on an interior facing side of the outer windshield panel. In an alternate embodiment, the silkscreen portion is positioned on an interior facing side of the inner windshield panel.

In one embodiment of the third aspect of the invention, the windshield is configured for use in a UTV.

In one embodiment of the third aspect of the invention, the laminated windshield comprises panels of glass that are not chemically strengthened.

A fourth aspect of the invention is directed to a laminated windshield that meets or exceeds the AS1 standard, the windshield comprising; an outer windshield panel, an inner windshield panel comprising heat-strengthened glass; and a polymeric material layer positioned between the outer windshield panel and the inner windshield panel.

In one embodiment of the fourth aspect of the invention, the tensile strength of the inner windshield panel is greater than or equal to 3500 PSI.

In one embodiment of the fourth aspect of the invention, the tensile strength of the inner windshield panel is less than or equal to 7500 PSI.

In one embodiment of the fourth aspect of the invention, the compressive strength of the inner windshield panel is greater than or equal to 3500 PSI.

In one embodiment of the fourth aspect of the invention, the compressive strength of the inner windshield panel is less than or equal to 7500 PSI.

In one embodiment of the third aspect of the invention, the tensile strength of the inner windshield panel is greater than or equal to 3500 PSI and less than or equal to 5000 PSI.

In one embodiment of the fourth aspect of the invention, the compressive strength of the inner windshield panel is greater than or equal to 3500 PSI and less than or equal to 5000 PSI.

In one embodiment of the fourth aspect of the invention, the polymeric material layer comprises a material selected from the list consisting of vinyl, polyvinyl butyral, thermoplastic polyurethane, ethylene-vinyl acetate, or a combination thereof. In a further embodiment thereof, the polymeric material layer comprises polyvinyl butyral. In a yet further embodiment of the fourth aspect of the invention, the polymeric material layer is polyvinyl butyral.

In one embodiment of the fourth aspect of the invention, the laminated windshield has at least one hole. In a further embodiment thereof, each of the at least one hole is configured to receive a windshield wiper. In an alternate further embodiment thereof, each of the at least one hole is configured to receive at least one fastener configured to mount the windshield to the vehicle. In an alternate further embodiment thereof, each of the at least one hole is configured to enable ventilation of the windshield.

In one embodiment of the fourth aspect of the invention, the windshield is configured for use in a utility terrain vehicle.

In one embodiment of the fourth aspect of the invention, the windshield has a thickness greater than or equal to 4 mm and less than or equal to 10 mm.

In one embodiment of the fourth aspect of the invention, the windshield has a thickness substantially equal to 6.16 mm.

In one embodiment of the fourth aspect of the invention, the windshield has a thickness substantially equal to 6.55 mm.

In one embodiment of the fourth aspect of the invention, at least one of the outer windshield panel and the inner windshield panel has a thickness greater than or equal to 1.8 and less than or equal to 4 mm.

In one embodiment of the fourth aspect of the invention, the inner windshield panel is heat strengthened by heating a raw glass windshield panel to a first temperature. In one such embodiment, the first temperature is greater than or equal to 610° C. and less than or equal to 630° C. In an alternate embodiment, the first temperature is greater than or equal to 618° C. and less than or equal to 622° C.

In one embodiment of the fourth aspect of the invention comprising the heat strengthening of glass as described above, the inner windshield panel is cooled to a second temperature after the heating process. In one such embodiment, the second temperature is less than or equal to 510° C. Optionally, cooling the windshield panel may happen at a cooling rate. In one such embodiment, the cooling rate is less than or equal to 30° C./second.

In one embodiment of the fourth aspect of the invention, the windshield further comprises a silkscreen portion. In one such embodiment, the silkscreen portion is positioned on an interior facing side of the outer windshield panel. In an alternate embodiment, the silkscreen portion is positioned on an interior facing side of the inner windshield panel.

In one embodiment of the fourth aspect of the invention, the windshield is configured for use in a UTV.

In one embodiment of the fourth aspect of the invention, the laminated windshield comprises panels of glass that are not chemically strengthened.

In one embodiment, the outer windshield panel does not comprise heat strengthened glass.

A fifth aspect of the invention is directed to a laminated windshield that meets or exceeds the AS1 standard, the windshield comprising; an outer windshield panel comprising heat strengthened glass, an inner windshield panel; and a polymeric material layer positioned between the outer windshield panel and the inner windshield panel.

In one embodiment of the fifth aspect of the invention, the tensile strength of the outer windshield panel is greater than or equal to 3500 PSI.

In one embodiment of the fifth aspect of the invention, the tensile strength of the outer windshield panel is less than or equal to 7500 PSI.

In one embodiment of the fifth aspect of the invention, the compressive strength of the outer windshield panel is greater than or equal to 3500 PSI.

In one embodiment of the fifth aspect of the invention, the compressive strength of the outer windshield panel is less than or equal to 7500 PSI.

In one embodiment of the fifth aspect of the invention, the tensile strength of the outer windshield panel is greater than or equal to 3500 PSI and less than or equal to 5000 PSI.

In one embodiment of the fifth aspect of the invention, the compressive strength of the outer windshield panel is greater than or equal to 3500 PSI and less than or equal to 5000 PSI.

In one embodiment of the fifth aspect of the invention, the polymeric material layer comprises a material selected from the list consisting of vinyl, polyvinyl butyral, thermoplastic polyurethane, ethylene-vinyl acetate, or a combination thereof. In a further embodiment thereof, the polymeric material layer comprises polyvinyl butyral. In a yet further embodiment of the fifth aspect of the invention, the polymeric material layer is polyvinyl butyral.

In one embodiment of the fifth aspect of the invention, the laminated windshield has at least one hole. In a further embodiment thereof, each of the at least one hole is configured to receive a windshield wiper. In an alternate further embodiment thereof, each of the at least one hole is configured to receive at least one fastener configured to mount the windshield to the vehicle. In an alternate further embodiment thereof, each of the at least one hole is configured to enable ventilation of the windshield.

In one embodiment of the fifth aspect of the invention, the windshield is configured for use in a utility terrain vehicle.

In one embodiment of the fifth aspect of the invention, the windshield has a thickness greater than or equal to 4 mm and less than or equal to 10 mm.

In one embodiment of the fifth aspect of the invention, the windshield has a thickness substantially equal to 6.16 mm.

In one embodiment of the fifth aspect of the invention, the windshield has a thickness substantially equal to 6.55 mm.

In one embodiment of the fifth aspect of the invention, at least one of the outer windshield panel and the inner windshield panel has a thickness greater than or equal to 1.8 and less than or equal to 4 mm.

In one embodiment of the fifth aspect of the invention, the outer windshield panel is heat strengthened by heating a raw glass windshield panel to a first temperature. In one such embodiment, the first temperature is greater than or equal to 610° C. and less than or equal to 630° C. In an alternate embodiment, the first temperature is greater than or equal to 618° C. and less than or equal to 622° C.

In one embodiment of the fifth aspect of the invention comprising the heat strengthening of glass as described above, the outer windshield panel is cooled to a second temperature after the heating process. In one such embodiment, the second temperature is less than or equal to 510° C. Optionally, cooling the windshield panel may happen at a cooling rate. In one such embodiment, the cooling rate is less than or equal to 30° C./second.

In one embodiment of the fifth aspect of the invention, the windshield further comprises a silkscreen portion. In one such embodiment, the silkscreen portion is positioned on an interior facing side of the outer windshield panel. In an alternate embodiment, the silkscreen portion is positioned on an interior facing side of the inner windshield panel.

In one embodiment of the fifth aspect of the invention, the windshield is configured for use in a UTV.

In one embodiment of the fifth aspect of the invention, the laminated windshield comprises panels of glass that are not chemically strengthened.

In one embodiment of the fifth aspect of the invention, the inner windshield panel does not comprise heat strengthened glass.

A sixth aspect of the invention is directed to a heat-strengthened vehicle windshield panel configured to be used in a laminated windshield that meets or exceeds the AS1 standard.

In one embodiment of the sixth aspect of the invention, the tensile strength of the heat-strengthened vehicle windshield panel is greater than or equal to 3500 PSI.

In one embodiment of the sixth aspect of the invention, the tensile strength of the heat-strengthened vehicle windshield panel is less than or equal to 7500 PSI.

In one embodiment of the sixth aspect of the invention, the compressive strength of the heat-strengthened vehicle windshield panel is greater than or equal to 3500 PSI.

In one embodiment of the sixth aspect of the invention, the compressive strength of the heat-strengthened vehicle windshield panel is less than or equal to 7500 PSI.

In one embodiment of the sixth aspect of the invention, the tensile strength of the heat-strengthened vehicle windshield panel is greater than or equal to 3500 PSI and less than or equal to 5000 PSI.

In one embodiment of the sixth aspect of the invention, the compressive strength of the heat-strengthened vehicle windshield panel is greater than or equal to 3500 PSI and less than or equal to 5000 PSI.

In one embodiment of the sixth aspect of the invention, the heat-strengthened vehicle windshield panel has at least one hole. In a further embodiment thereof, each of the at least one hole is configured to receive a windshield wiper. In an alternate further embodiment thereof, each of the at least one hole is configured to receive at least one fastener configured to mount the windshield to the vehicle. In an alternate further embodiment thereof, each of the at least one hole is configured to enable ventilation of the windshield.

In one embodiment of the sixth aspect of the invention, the heat-strengthened vehicle windshield panel is configured for use in a utility terrain vehicle.

In one embodiment of the sixth aspect of the invention, the heat-strengthened vehicle windshield panel has a thickness greater than or equal to 1.8 and less than or equal to 4 mm.

In one embodiment of the sixth aspect of the invention, the heat-strengthened vehicle windshield panel is heat strengthened by heating a raw glass windshield panel to a first temperature. In one such embodiment, the first temperature is greater than or equal to 610° C. and less than or equal to 630° C. In an alternate embodiment, the first temperature is greater than or equal to 618° C. and less than or equal to 622° C.

In one embodiment of the sixth aspect of the invention comprising the heat strengthening of glass as described above, the heat-strengthened vehicle windshield panel is cooled to a second temperature after the heating process. In one such embodiment, the second temperature is less than or equal to 510° C. Optionally, cooling the windshield panel may happen at a cooling rate. In one such embodiment, the cooling rate is less than or equal to 30° C./second.

In one embodiment of the sixth aspect of the invention, the heat-strengthened vehicle windshield panel further comprises a silkscreen portion. In one such embodiment, the silkscreen portion is positioned on an interior facing side of the heat-strengthened vehicle windshield panel.

In one embodiment of the sixth aspect of the invention, the heat-strengthened vehicle windshield panel is configured for use in a UTV.

In one embodiment of the sixth aspect of the invention, the heat-strengthened vehicle windshield panel is not chemically strengthened.

The objects and advantages of the disclosed invention will be further appreciated in light of the following detailed descriptions and drawings.

BRIEF DESCRIPTION OF THE FIGURES

The accompanying drawings, which are incorporated in and constitute a part of this specification, illustrate embodiments of the invention and, together with the general description given above, and the detailed description given below, serve to explain the principles of embodiments of the invention. Similar reference numerals are used to indicate similar features throughout the various figures of the drawings.

DETAILED DESCRIPTION OF THE INVENTION

One skilled in the art will recognize that the various embodiments may be practiced without one or more of the specific details described herein, or with other replacement and/or additional methods, materials, or components. In other instances, well-known structures, materials, or operations are not shown or described in detail herein to avoid obscuring aspects of various embodiments of the invention. Similarly, for purposes of explanation, specific numbers, materials, and configurations are set forth herein in order to provide a thorough understanding of the invention. Furthermore, it is understood that the various embodiments shown in the figures are illustrative representations and are not necessarily drawn to scale.

Reference throughout this specification to "one embodiment" or "an embodiment" means that a particular feature, structure, material, or characteristic described in connection with the embodiment is included in at least one embodiment of the invention, but does not denote that they are present in every embodiment. Thus, the appearances of the phrases "in an embodiment" or "in another embodiment" in various places throughout this specification are not necessarily referring to the same embodiment of the invention. Further, "a component" may be representative of one or more components and, thus, may be used herein to mean "at least one."

Figure 1A:
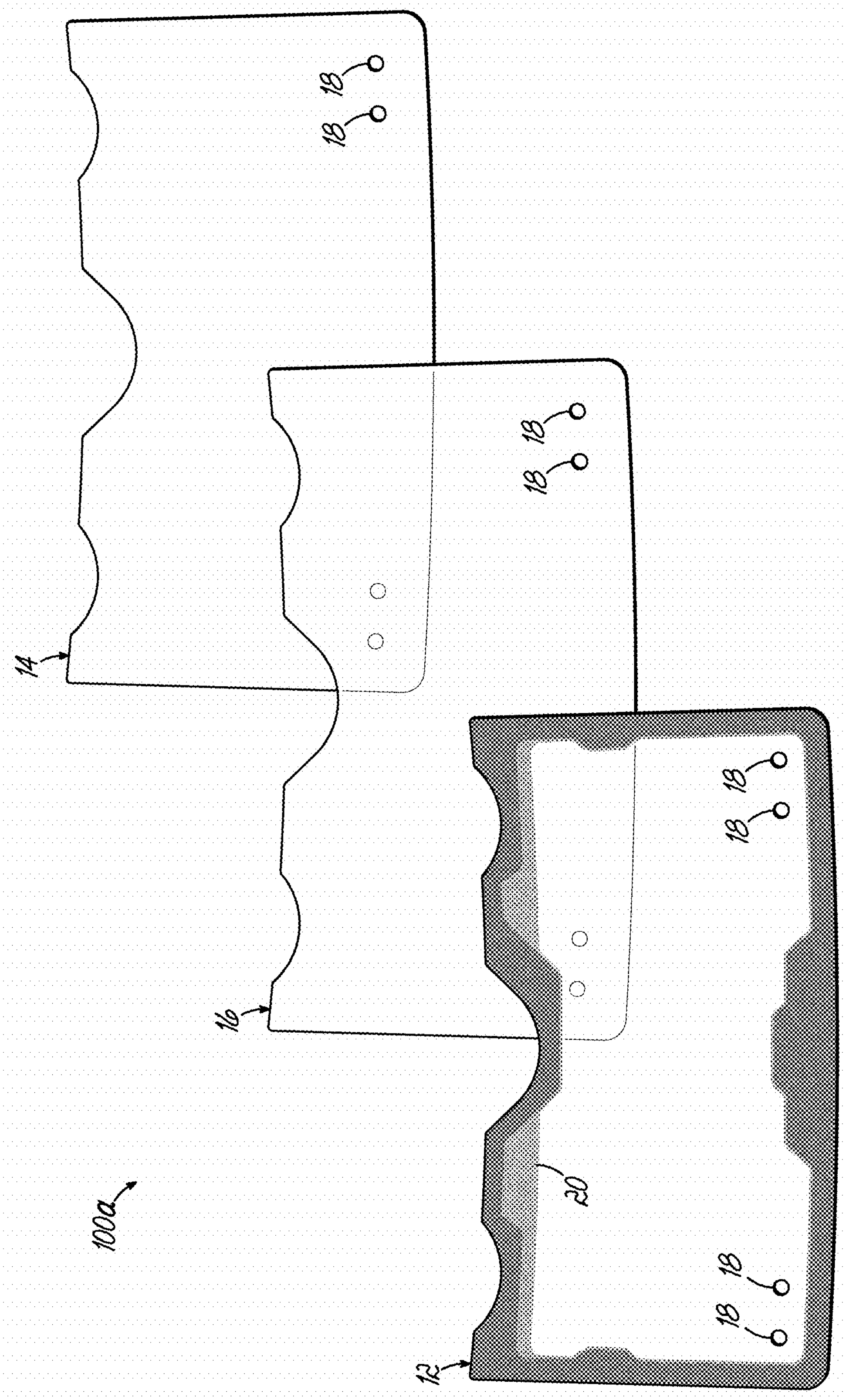
FIGS. 1A-1C are exploded views of a windshield in accordance with embodiments of the invention.
Figure 1B:
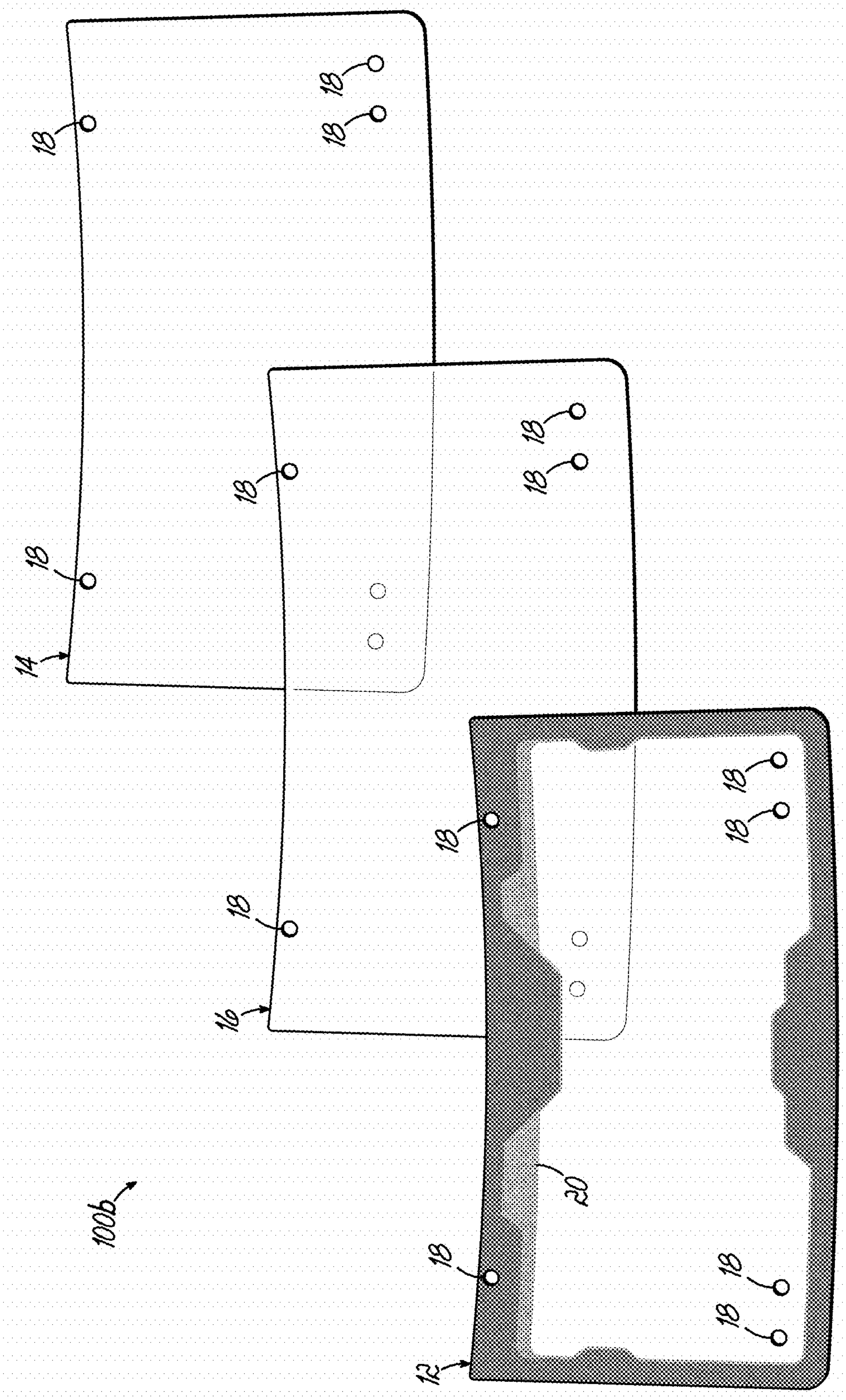
Figure 1C:
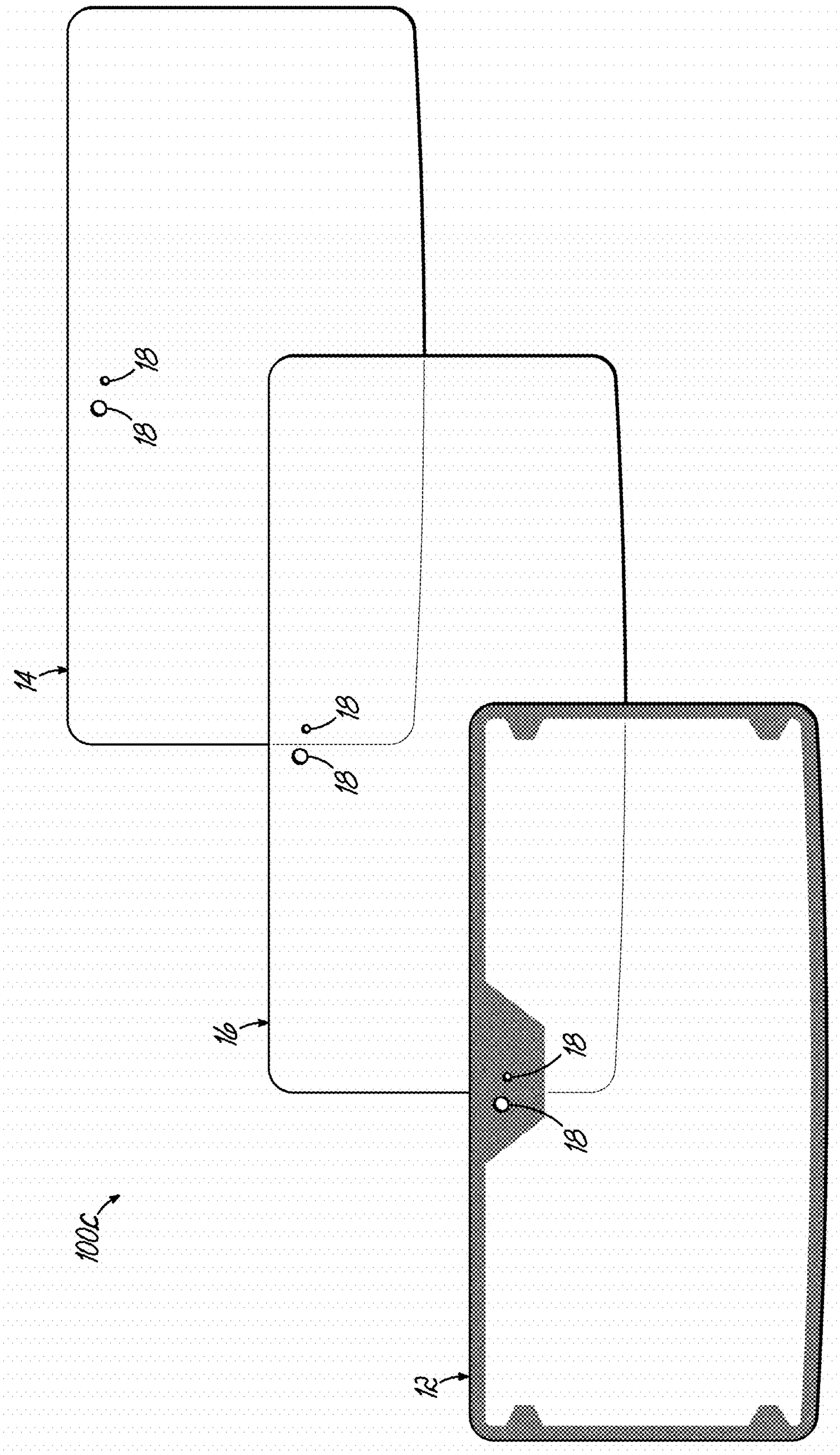

Embodiments of the disclosed invention are directed to durable laminated windshields with minimal optical distortion configured for use in specialty vehicles, methods for their production, and methods for producing panels therefore. With reference to FIGS. 1A, 1B, and 1C, an exploded schematic for a windshield 100A, 100B, 100C are respectively shown. The windshield 100A, 100B, 100C includes an inner panel 12, an outer panel 14, and a polymeric material panel 16 positioned between the inner panel 12 and the outer panel 14. As shown in FIG. 1, the inner panel 12, outer panel 14, and polymeric material panel 16 have substantially equivalent shapes such that they can form a windshield 100A, 100B, 100C having a perimeter substantially equal to each of the constituent panels when constructed. As shown in FIGS. 1A-1C, the windshields 100A-100C may have different shapes. In one embodiment, the shape of the windshield is configured to fit within a corresponding windshield slot in a vehicle, or alternatively a specialty vehicle. It should be understood that the windshield shapes shown are not intended to be limiting and other windshield shapes may be used in accordance with the properties of the windshields 100A, 100B, and 100C below.

The inner panel 12 and the outer panel 14 comprise one or more glass material selected from the list consisting of soda lime, float glass, borosilicate glass, other suitable types of glass, or some combination thereof. In a preferred embodiment, the glass material used for the inner panel 12 and the outer panel 14 comprises float glass. In one embodiment of the invention, the inner panel 12, the outer panel 14, or both comprise heat strengthened glass having a surface compressive strength and/or tensile strength that is greater than or equal to 3500 PSI. In one embodiment, the inner panel 12, the outer panel 14, or both comprise heat strengthened glass having a surface compressive strength that is greater than or equal to 3500 PSI and less than or equal to 7500 PSI, alternatively greater than or equal to 3500 PSI and less than or equal to 5500 PSI, or alternatively greater than or equal to 3500 PSI and less than or equal to 5000 PSI. In one embodiment, the inner panel 12, the outer panel 14, or both comprise heat strengthened glass having a tensile strength that is greater than or equal to 3500 PSI and less than or equal to 7500 PSI, alternatively greater than or equal to 3500 PSI and less than or equal to 5500 PSI, or alternatively greater than or equal to 3500 PSI and less than or equal to 5000 PSI. In some embodiments, it may be preferable to limit the heat strengthening of at least one of the inner windshield panel 12, the other panel 14, or both to ensure that degradation of the optical properties of the laminated windshield 10 is sufficiently limited to still meet the requirements of the AS1 standard.

The inner panel 12 and the outer panel 14 each have a thickness. Increasing the thickness of the inner panel 12, the outer panel 14, or both may increase the durability of the windshield panel by affecting properties such as the surface compressive strength and/or tensile strength. In one embodiment, the inner panel 12, the outer panel 14, or both have a thickness greater than or equal to 1.8 mm. In another embodiment, the inner panel 12, the outer panel 14, or both each have a thickness less than or equal to 4 mm. In another embodiment, the inner panel 12, the outer panel 14, or both have a thickness greater than or equal to 1.8 mm and less than or equal to 4 mm. In one preferred embodiment, the thickness of one or more of the inner panel 12 and the outer panel 14 is substantially equal to 2.7 mm, or alternatively equal to 2.7 mm. In another preferred embodiment, the thickness of one or more of the inner panel 12 and the outer panel 14 is substantially equal to 2.9 mm, or alternatively equal to 2.9 mm.

In any of the above embodiments, the inner panel 12 and the outer panel 14 may have substantially identical thicknesses, or alternatively identical thicknesses. In one embodiment, the outer panel 14 is thicker than the inner panel 12, alternatively the outer panel 14 is at least 0.2 mm thicker than the inner panel 12, alternatively the outer panel 14 is at least 0.5 mm thicker than the inner panel 12, or alternatively the outer panel 14 is at least 1 mm thicker than the inner panel 12.

The polymeric material panel 16 comprises one or more polymeric material selected from the list consisting of vinyl, polyvinyl butyral (PVB), resins having similar properties, other polymeric materials having similar properties, or some combination thereof. In one embodiment, the polymeric panel 16 comprises PVB. The polymeric material panel 16 has a thickness. In one embodiment, the thickness of the polymeric material panel 16 is greater than or equal to 0.5 mm. In another embodiment, the thickness of the polymeric material panel 16 is less than or equal to 1.5 mm. In another embodiment, the thickness of the polymeric material panel 16 is greater than 0.5 mm and less than or equal to 1.5 mm. In one preferred embodiment, the polymeric panel 16 has a thickness substantially equal to 0.7 mm, alternatively substantially equal to 0.76 mm, or alternatively substantially equal to 1.1 mm. In another preferred embodiment, the polymeric material panel 16 has a thickness substantially equal to 0.7 mm, alternatively substantially equal to 0.76 mm, or alternatively substantially equal to 1.1 mm.

The windshield 100A, 100B, 100C may have a thickness. In one such embodiment, the windshield has a thickness greater than or equal to 4 mm and less than or equal to 10 mm. In a preferred embodiment, the windshield 100A, 100B, 100C has a thickness substantially equal to 6.76 mm, alternatively substantially equal to 7.1, alternatively substantially equal to 6.16 mm, alternatively substantially equal to 6.36 mm, alternatively substantially equal to 6.56 mm, alternatively substantially equal to 6.5 mm, alternatively substantially equal to 6.7 mm, or alternatively substantially equal to 6.9 mm.

The windshield 100A, 100B, 100C may have one or more optional hole 18 positioned in the same or substantially the same portion of the inner panel 12, the outer panel 14, and the polymeric material panel 16. In one such embodiment, each of the one or more hole 18 is configured to receive and support a windshield wiper (not shown) without needing to scallop the glass around the portion of the windshield wiper contacting the glass. In embodiments including one or more optional hole 18, the optional hole 18 is formed in the inner panel 12 and the outer panel 14 before heat strengthening.

The inner panel 12 may optionally have a silkscreen portion 20 that is painted a darker color than the rest of the inner panel 12. In one embodiment, the silkscreen portion 20 is painted black. In one embodiment, the silkscreen portion is painted with a ceramic based ink to reduce the visible light through the silkscreen portion 20. In one embodiment, the silkscreen portion 20 is positioned on an upper portion of the inner panel 12 such as, for example, above the AS1 line for the windshield 100A, 100B, 100C. As shown, the silkscreen portion is on the inner panel 12, however it may instead or also be on the outer panel of glass 14 (not shown). The silkscreen portion 20 may be positioned on the inner side of a panel of glass where it is included. In one such embodiment, the silkscreen portion 20 is positioned on the interior side of the inner panel 12 (i.e., the front side). In an alternate embodiment, silkscreen portion 20 is positioned on the interior side of the outer panel 14 (i.e., the back side).

Figure 2:
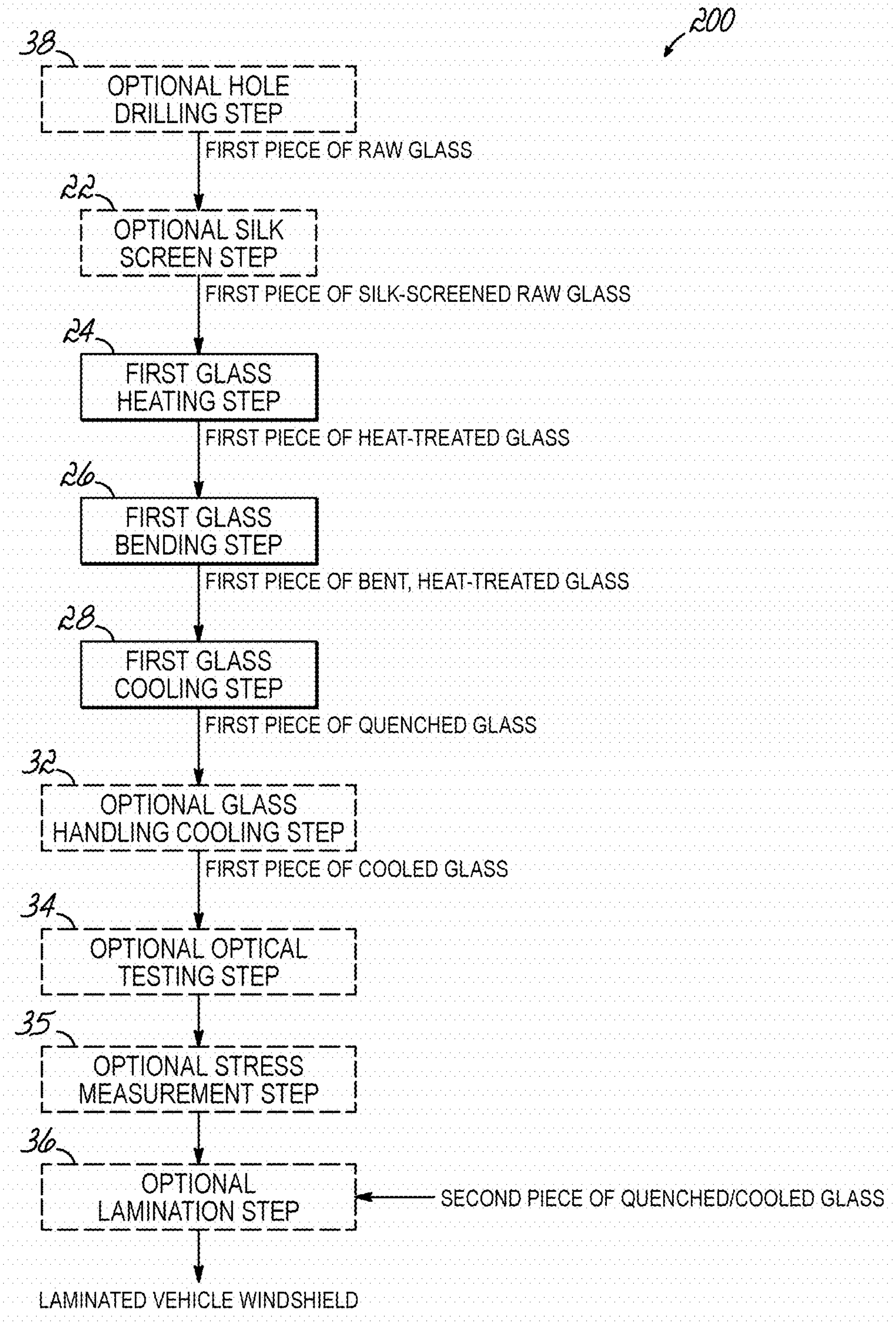
FIG. 2 is a flowchart of a method of producing a windshield or a panel therefore in accordance with an embodiment of the invention.

With reference to FIG. 2, a method 200 is shown. The method 200 includes a first glass heating step 24, a first glass bending step 26, and a first glass cooling step 28. The first glass heating step 24 precedes the first glass bending step 26, and the first glass bending step 26 precedes the first glass cooling step 28. The method 200 may further include any number of the optional steps discussed above, such as the optional optical testing step 34, the optional glass handling cooling step 32, and the optional lamination step 36 (discussed further below).

With respect to the first glass heating step 24, a first piece of raw glass is heated to a first temperature in a heating device, such as a furnace, to produce a first piece of heat-treated glass. In one embodiment, the first temperature is a minimum temperature, wherein the minimum temperature is greater than or equal to 560° C., alternatively greater than or equal to 600° C., alternatively greater than or equal to 610° C., alternatively greater than or equal to 620° C., or alternatively greater than or equal to 640° C. In one embodiment, the first temperature is a maximum temperature, wherein the maximum temperature is less than or equal to 700° C., alternatively less than or equal to 680° C., alternatively less than or equal to 660° C., alternatively less than or equal to 645° C., or alternatively less than or equal to 630° C. In one embodiment, the first temperature is a temperature range having a minimum and maximum temperature, wherein the temperature range is greater than or equal to 560° C. and less than or equal to 700° C., alternatively greater than or equal to 600° C. and less than or equal to 700° C., alternatively greater than or equal to 620° C. and less than or equal to 680° C., alternatively greater than or equal to 640° C. and less than or equal to 660° C., or alternatively greater than or equal to 640° C. and less than or equal to 645° C. In a preferred embodiment, the first temperature is greater than or equal to 610° C. and less than or equal to 630° C., or alternatively greater than or equal to 618° C. and less than or equal to 622° C. In another preferred embodiment, the first temperature is substantially equal to 620° C., alternatively substantially equal to 618° C., or alternatively substantially equal to 622° C.

With further respect to the first glass heating step 24, the temperature of the first piece of raw glass during the heating process may be measured, such as by using a thermal imaging camera, to ensure that the glass is heated to the first temperature. In embodiments of the first glass heating step 24 having a minimum temperature, the temperature of the heating device may be increased if the temperature of the glass reaches or nears the minimum temperature. In embodiments of the first glass heating step 24 having a maximum temperature, the temperature of the heating device may be reduced if the temperature of the glass reaches or nears the maximum temperature. The heating device may be heated to a higher temperature than the first temperature, wherein the temperature of the heating device is dependent on the thickness and/or mass of the piece of raw glass.

With further respect to the first glass heating step 24, the first piece of raw glass is maintained at the first temperature for a heat treatment duration. The heat treatment duration may be dependent on the thickness and/or mass of the piece of raw glass. In one embodiment, the heat treatment duration may be less than or equal to 5 minutes. In a preferred embodiment, the heat treatment duration is less than or equal to about 4 minutes.

With respect to the first glass bending step 26, the first piece of heat-treated glass may be bent to produce a first bent, heat-treated piece of glass. In one embodiment, the first bent, heat-treated piece of glass is formed into a shape configured for use in a vehicle windshield such as, for example, a specialty vehicle windshield. In one embodiment, a bending device, such as an articulated quench or bending iron, configured to form the shape of the desired windshield is used to bend the piece of heat-treated glass. In one such embodiment, the bending device is configured to bend the glass in only one direction (i.e., cylindrical bending). In another embodiment, the bending device is configured to bend the glass in multiple directions (i.e., complex bending). In one embodiment, the first glass bending step 26 involves the use of a bending device having a male component configured to press the first, heat-treated, piece of glass into a female component configured to receive the first, heat-treated piece of glass such that the first, bent, heat-treated piece of glass is formed. In one embodiment, the first glass bending step 26 involves the use of a bending device with a female component but without a male component such that the first bent, heat-treated piece of glass is formed by the first, heat-treated piece of glass sagging into the female component. The heat-treated glass is maintained at or substantially near the first temperature during the first glass bending step 26. The first glass bending step 26 may take less than or equal to 1 minute.

With respect to the first glass cooling step 28, the bent, heat-treated piece of glass is cooled to a second temperature to produce a quenched piece of glass. Alternatively, the first glass cooling step 28 may optionally further cool the first piece of glass to a temperature below the second temperature, alternatively to a temperature well below the second temperature (e.g., at least 100° C. below the second temperature, at least 300° C. below the second temperature), or alternatively to a third temperature at which the second piece of glass can be handled (discussed further below). The first glass cooling step 28 may involve subjecting the bent, heat-treated piece of glass to a means of temperature reduction such as, for example, flowing a gas (e.g., air, nitrogen, carbon dioxide, noble gases, other inert gases, etc.) over the bent, heat-treated piece of glass until it reaches the second temperature. In a preferred embodiment, flowing a gas to cool the bent, heat-treated piece of glass comprises flowing air. In such embodiments, the cooling rate for the first glass cooling step 28 may be modulated by increasing the pressure of the gas flowed over the glass to increase the cooling rate and decreasing the pressure of the gas flowed over the glass to decrease the cooling rate. In one embodiment, the bent, heat-treated piece of glass is cooled from the inner side and outer side of the bent, heat-treated glass simultaneously. In a further such embodiment, the cooling rate for the outer side is substantially equal to the cooling rate for the inner side of the bent, heat-treated piece of glass.

In one embodiment, the second temperature is a maximum temperature, wherein the maximum temperature is less than or equal to 530° C., alternatively less than or equal to 510° C., or alternatively less than or equal to 490° C. In one embodiment, the second temperature is a temperature range, wherein the temperature is greater than or equal to 490° C. and less than or equal to 530° C., alternatively greater than or equal to 500° C. and less than or equal to 520° C., or alternatively greater than or equal to 505° C. and less than or equal to 515° C. In one embodiment, the second temperature is well below 510° C., such as a temperature less than or equal to 410° C., or alternatively to a temperature less than or equal to 210° C. In one embodiment, the second temperature is less than the annealing point temperature of the glass, or alternatively less than the strain point temperature of the glass.

The first glass cooling step 28 may involve cooling the glass at a first glass cooling rate. In one such embodiment, the first glass cooling rate may be a minimum rate, wherein the minimum rate is greater than or equal to 10° C./second, alternatively greater than or equal to 20° C./second, greater than or equal to 30° C./second, alternatively greater than or equal to 40° C./second, alternatively greater than or equal to 50° C./second, alternatively greater than 60° C./second, alternatively greater than or equal to 70° C./second, alternatively greater than or equal to 80° C./second, or alternatively greater than or equal to 90° C./second. In another such embodiment, the first glass cooling rate may be a maximum rate, wherein the maximum rate is less than or equal to 10° C./second, alternatively less than or equal to 20° C./second, alternatively less than or equal to 30° C./second, alternatively less than or equal to 40° C./second, alternatively less than or equal to 50° C./second, alternatively less than 60° C./second, alternatively less than or equal to 70° C./second, alternatively less than or equal to 80° C./second, or alternatively less than or equal to 90° C./second. In yet another such embodiment, the first glass cooling rate is a cooling rate range, wherein the cooling rate is greater than or equal to 10° C./second and less than or equal to 90° C./second, alternatively greater than or equal to 20° C./second and less than or equal to 80° C./second, alternatively greater than or equal to 30° C./second and less than or equal to 70° C./second, or alternatively greater than or equal to 40° C./second and less than or equal to 60° C./second.

The cooling rate for the first glass cooling step 28 may be estimated using a single point light source. This single point light source can also be used to implement an optional optical testing step 34 for the bent, heat-treated piece of glass. In one such embodiment, the optional optical testing step 34 is used to determine whether an individual panel of glass is suitable for use in a laminated windshield 100A, 100B, 100C before the lamination process (described further below). This can reduce wasted glass or wasted energy used to remedy defective pieces of glass when only one piece of glass does not have the necessary optical distortion property by not wasting or remedying a second panel of glass that has the necessary optical distortion property. In one such embodiment, a bent, heat-treated panel of glass has the necessary optical distortion property if it has optical distortion, including but not limited to roller wave distortion and edge warp distortion, less than the allowable optical distortion under the AS1 standards.

Following the first glass cooling step 28, a grazing angle surface polarimeter (GASP) may be used to measure one or more of the stress, surface compression, and/or tensile strength within the glass in an optional stress measurement step 35. In such embodiments, oil is applied to the surface of the bent, heat-treated piece of glass after the first glass cooling step 28 so that the GASP can measure the deflection of light, which correlates with the stress, surface compression, and/or tensile strength in the piece of glass. In one such embodiment, the GASP is used to measure the stress within the glass after it cools to room temperature. In one embodiment, the optional stress measurement step 35 is used to determine whether an individual panel of glass is suitable for use in a laminated windshield 100A, 100B, 100C before the lamination process (described further below). This can reduce wasted glass or wasted energy used to remedy defective pieces of glass when only one piece of glass does not have the necessary stress, surface compression, and/or tensile strength property by not wasting or remedying a second panel of glass that has the necessary stress, surface compression, and/or tensile strength property. In one such embodiment, a bent, heat-treated panel of glass has the necessary stress, surface compression, and/or tensile strength property if it has a surface compression greater than or equal to 3500 PSI and less than or equal to 7500 PSI, alternatively greater than or equal to 3500 PSI and less than or equal to 5500 PSI, or alternatively greater than or equal to 3500 PSI and less than or equal to 5000 PSI. In one embodiment, a bent, heat-treated panel of glass has the necessary stress, surface compression, and/or tensile strength property if it has a tensile strength greater than or equal to 3500 PSI and less than or equal to 7500 PSI, alternatively greater than or equal to 3500 PSI and less than or equal to 5500 PSI, or alternatively greater than or equal to 3500 PSI and less than or equal to 5000 PSI.

In one embodiment of the method 200, the first piece of quenched glass produced by method 200 is configured for use as an inner panel 12 for a laminated windshield, such as a laminated windshield configured for use in specialty vehicles. In a further embodiment thereof, the method 200 further includes an optional silkscreen step 22 to treat the first piece of raw glass prior to the first glass heating step 24 which may be implemented in the same manner as the optional silkscreen step 42 (discussed further below). In another embodiment of the method 200, the first piece of quenched glass produced by method 200 is configured for use as an outer panel 14 for a laminated windshield, such as a laminated windshield for use in specialty vehicles.

Figure 3:
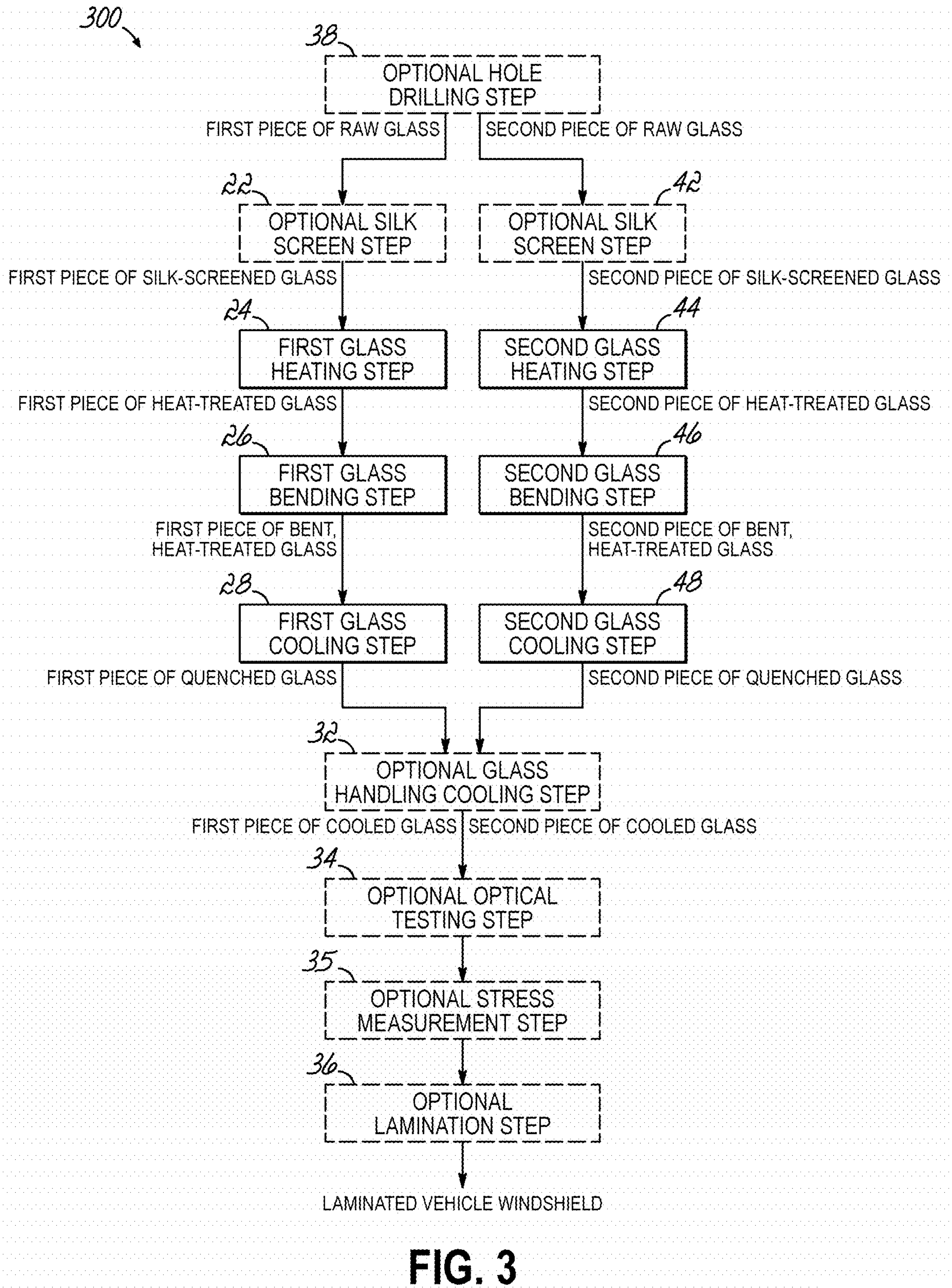
FIG. 3 is a flowchart of a method of producing a windshield or a panel therefore in accordance with an embodiment of the invention.

With reference to FIG. 3, the method 300 is shown. The method 300 includes the first glass heating step 24, the first glass bending step 26, and the first glass cooling step 28 described above for processing the first piece of raw glass. The method 300 may further include any number of the optional steps discussed above, such as the optional optical testing step, the optional glass handling cooling step, and the optional lamination step (discussed further below). Unless otherwise indicated, the steps described above for the method 200 can be implemented in the same manner set forth above in the method 300. The method 300 further includes a second glass heating step 44, a second glass bending step 46, and a second glass cooling step 48 for treating a second piece of raw glass. The second glass heating step 44 precedes the second glass bending step 46, and the second glass bending step 46 precedes the second glass cooling step 48.

With respect to the second glass heating step 44, a second piece of raw glass is heated to a first temperature in a heating device, such as a furnace, to produce a second piece of heat-treated glass. In one embodiment, the first temperature is a minimum temperature, wherein the minimum temperature is greater than or equal to 560° C., alternatively greater than or equal to 600° C., alternatively greater than or equal to 610° C., alternatively greater than or equal to 620° C., or alternatively greater than or equal to 640° C. In one embodiment, the first temperature is a maximum temperature, wherein the maximum temperature is less than or equal to 700° C., alternatively less than or equal to 680° C., alternatively less than or equal to 660° C., alternatively less than or equal to 645° C., or alternatively less than or equal to 630° C. In one embodiment, the first temperature is a temperature range having a minimum and maximum temperature, wherein the temperature range is greater than or equal to 560° C. and less than or equal to 700° C., greater than or equal to 600° C. and less than or equal to 700° C., alternatively greater than or equal to 620° C. and less than or equal to 680° C., alternatively greater than or equal to 640° C. and less than or equal to 660° C., or alternatively greater than or equal to 640° C. and less than or equal to 645° C. In a preferred embodiment, the first temperature is greater than or equal to 610° C. and less than or equal to 630° C., or alternatively greater than or equal to 618° C. and less than or equal to 622° C. In another preferred embodiment, the first temperature is substantially equal to 620° C., alternatively substantially equal to 618° C., or alternatively substantially equal to 622° C.

With further respect to the second glass heating step 44, the temperature of the second piece of raw glass during the heating process may be measured, such as by using a thermal imaging camera, to ensure that the raw glass is heated to the first temperature. In embodiments of the second glass heating step 44 having a minimum temperature, the temperature of the heating device may be increased if the temperature of the glass reaches or nears the minimum temperature. In embodiments of the second glass heating step 44 having a maximum temperature, the temperature of the heating device may be reduced if the temperature of the glass reaches or nears the maximum temperature. The heating device may be heated to a higher temperature than the first temperature, wherein the temperature of the heating device is dependent on the thickness and/or mass of the second piece of raw glass.

With further respect to the second glass heating step 44, the second piece of raw glass is maintained at the first temperature for a heat treatment duration. The heat treatment duration may be dependent on the thickness and/or mass of the second piece of raw glass. In one embodiment, the heat treatment duration may be less than or equal to 10 minutes, alternatively less than or equal to 1 minute, alternatively less than or equal to 30 seconds, or alternatively less than or equal to 10 seconds.

In one embodiment, the first temperature in the second glass heating step 44 is the approximately equivalent to or equivalent to the first temperature in the first glass heating step 24. In a further embodiment thereof, the first glass heating step 24 and the second glass heating step 44 take place simultaneously using the same heating device. In such embodiments, the temperature of the heating device and/or the heat treatment duration may depend on the thicknesses and/or weights of the first and second pieces of raw glass.

With respect to the second glass bending step 46, the second piece of heat-treated glass may be bent to produce a second bent, heat-treated piece of glass. In one embodiment, the second bent, heat-treated piece of glass is formed into a shape configured for use in a vehicle windshield such as, for example, a specialty vehicle windshield. In one embodiment, a bending device, such as an articulated quench, ring tool, or a bending iron, configured to form the shape of the desired windshield is used to bend the piece of heat-treated glass. In one embodiment, the second glass bending step 46 involves the use of a bending device having a male component configured to press the second, heat-treated, piece of glass into a female component configured to receive the second, heat-treated piece of glass such that the second, bent, heat-treated piece of glass is formed. In one embodiment, the second glass bending step 46 involves the use of a bending device with a female component but without a male component such that the second bent, heat-treated piece of glass is formed by the second, heat-treated piece of glass sagging into the female component. In a further embodiment, the heat-treated glass is maintained at or substantially near the first temperature during the second glass bending step 46. The second glass bending step 46 may take less than or equal to 1 minute.

With respect to the second glass cooling step 48, the second bent, heat-treated piece of glass is cooled to a second temperature to produce a second quenched piece of glass. Alternatively, the second glass cooling step 48 may optionally further cool the second piece of glass to a temperature below the second temperature, alternatively to a temperature well below the second temperature (e.g., at least 100° C. below the second temperature, at least 300° C. below the second temperature), or alternatively to a third temperature at which the second piece of glass can be handled (discussed further below). The second glass cooling step 48 may involve subjecting the second bent, heat-treated piece of glass to a means of temperature reduction such as, for example, flowing a gas (e.g., air, nitrogen, carbon dioxide, a noble gas, etc.) over the bent, heat-treated piece of glass until it reaches the second temperature. In such embodiments, the cooling rate for the second glass cooling step 48 may be modulated by increasing the pressure of the gas flowed over the glass to increase the cooling rate and decreasing the pressure of the gas flowed over the glass to decrease the cooling rate. In one embodiment, the bent, heat-treated piece of glass is cooled from the inner side and outer side of the bent, heat-treated glass simultaneously. In a further such embodiment, the cooling rate for the outer side is substantially equal to the cooling rate for the inner side of the bent, heat-treated piece of glass.

In one embodiment, the second temperature is a maximum temperature, wherein the maximum temperature is less than or equal to 530° C., alternatively less than or equal to 510° C., or alternatively less than or equal to 490° C. In one embodiment, the second temperature is a temperature range, wherein the temperature is greater than or equal to 490° C. and less than or equal to 530° C., alternatively greater than or equal to 500° C. and less than or equal to 520° C., or alternatively greater than or equal to 505° C. and less than or equal to 515° C. In one embodiment, the second temperature is approximately 510° C. In one embodiment, the second temperature is well below 510° C., such as a temperature less than or equal to 410° C., or alternatively to a temperature less than or equal to 210° C. In one embodiment, the second temperature is less than the annealing point temperature of the glass, or alternatively less than or equal to the strain point temperature of the glass.

The second glass cooling step 48 may involve cooling the glass at a second glass cooling rate. In one such embodiment, the second glass cooling rate may be a minimum rate, wherein the minimum rate is greater than or equal to 10° C./second, alternatively greater than or equal to 20° C./second, alternatively greater than or equal to 30° C./second, alternatively greater than or equal to 40° C./second, alternatively greater than or equal to 50° C./second, alternatively greater than 60° C./second, alternatively greater than or equal to 70° C./second, alternatively greater than or equal to 80° C./second, or alternatively greater than or equal to 90° C./second. In another such embodiment, the second glass cooling rate may be a maximum rate, wherein the maximum rate is less than or equal to 10° C./second, alternatively less than or equal to 20° C./second, alternatively less than or equal to 30° C./second, alternatively less than or equal to 40° C./second, alternatively less than or equal to 50° C./second, alternatively less than 60° C./second, alternatively less than or equal to 70° C./second, alternatively less than or equal to 80° C./second, or alternatively less than or equal to 90° C./second. In yet another such embodiment, the second glass cooling rate is a cooling rate range, wherein the cooling rate is greater than or equal to 10° C./second and less than or equal to 90° C./second, alternatively greater than or equal to 20° C./second and less than or equal to 80° C./second, or alternatively greater than or equal to 30° C./second and less than or equal to 70° C./second, or alternatively greater than or equal to 40° C./second and less than or equal to 60° C./second.

The cooling rate for the second glass cooling step 48 may be estimated using a single point light source. The single point light source can also be used to implement an optional optical testing step 34 for the bent, heat-treated piece of glass. In one such embodiment, the optional optical testing step 34 is used to determine whether an individual panel of glass is suitable for use in a laminated windshield 100A, 100B, 100C before the lamination process (described further below). This can reduce wasted glass or wasted energy used to remedy defective pieces of glass when only one piece of glass does not have the necessary optical distortion property by not wasting or remedying a second panel of glass that has the necessary optical distortion property. In one such embodiment, a bent, heat-treated panel of glass has the necessary optical distortion property if it has optical distortion, including but not limited to roller wave distortion and edge warp distortion, less than the allowable optical distortion under the AS1 standards.

Following the second glass cooling step 48, a GASP may be used to measure one or more of the stress, surface compression, and/or tensile strength within the glass in an optional stress measurement step 35. In such embodiments, oil is applied to the surface of the bent, heat-treated piece of glass after the second glass cooling step 48 so that the GASP can measure the deflection of light, which correlates with the stress, surface compression, and/or tensile strength in the piece of glass. In one such embodiment, the GASP is used to measure the stress within the glass after it cools to room temperature. In one embodiment, the optional stress measurement step 35 is used to determine whether an individual panel of glass is suitable for use in a laminated windshield 100A, 100B, 100C before the lamination process (described further below). This can reduce wasted glass or wasted energy used to remedy defective pieces of glass when only one piece of glass does not have the necessary stress, surface compression, and/or tensile strength property by not wasting or remedying a second panel of glass that has the necessary stress, surface compression, and/or tensile strength property. In one such embodiment, a bent, heat-treated panel of glass has the necessary stress, surface compression, and/or tensile strength property if it has a surface compression greater than or equal to 3500 PSI and less than or equal to 7500 PSI, alternatively greater than or equal to 3500 PSI and less than or equal to 5500 PSI, or alternatively greater than or equal to 3500 PSI and less than or equal to 5000 PSI. In one embodiment, a bent, heat-treated panel of glass has the necessary stress, surface compression, and/or tensile strength property if it has a tensile strength greater than or equal to 3500 PSI and less than or equal to 7500 PSI, alternatively greater than or equal to 3500 PSI and less than or equal to 5500 PSI, or alternatively greater than or equal to 3500 PSI and less than or equal to 5000 PSI.

With continued reference to the method 300, the first glass heating step 24, the first glass bending step 26, and the first glass cooling step 28 may be configured to produce an outer panel 14 for a laminated windshield while the second glass heating step 44, second glass bending step 46, and second glass cooling step 48 are configured to produce an inner panel for a laminated windshield. Whereas in conventional methods for producing laminated windshields the above-mentioned heating steps 24, 44, bending steps 26, 46, and cooling steps 28, 48 may often be done simultaneously (i.e., while the two panels are in contact with each other), it can be advantageous to conduct one or more of the above bending steps 26, 46 and/or cooling steps 28, 48 separately for each windshield panel in at least one embodiment of the present invention. In one such embodiment, the bending step 26 and the bending step 46 are not performed as a single step (i.e., the windshield panels are separate during their individual bending steps) at least in part because slight differences in the bending parameters between the outer and inner windshield panels can cause increased optical distortion, defects or fractures in one or more of the windshield panels if they are bent together. In another such embodiment, the cooling step 28 and the cooling step 48 are not performed as a single step (i.e., the windshield panels are separate during their individual cooling steps) at least in part because slight differences in the cooling parameters between the outer and inner windshield panels can cause increased optical distortion, defects and/or fractures in one or more of the windshield panels if they are cooled together.

In embodiments wherein the method 300 is configured to produce an inner windshield panel, the method 300 may further include an optional silkscreen step 42 to treat the second piece of raw glass prior to the second glass heating step 44. The optional silkscreen step 42 includes painting a portion of the perimeter of the second piece of raw glass. In a further embodiment, the optional silkscreen step 42 includes painting a portion of the interior side of the second piece of raw glass. The purpose of a silkscreen step 42 may be, for example, improving the aesthetic appearance of the windshield panel, improving the aesthetic appearance of the finished windshield, decreasing the difficulty in properly aligning the inner and outer windshield panels before or during lamination, adding UV protection to a portion of the windshield, or some other similar purpose. In some embodiments, the silkscreen step 42 involves printing a dark or black ink onto the second piece of raw glass. For that reason, the heating parameters for the heating device in the second glass heating step 44 and/or the cooling device in the second glass cooling step 48 may require slight adjustments due to the increased heat retained by the darker portions of the glass. However, the temperature parameters of the glass itself in the above referenced steps remain unchanged, or alternatively remain substantially unchanged.

With reference to FIGS. 2 and 3, the methods 200 and 300 may further include an optional glass handling cooling step 32 to produce one or more cooled piece of glass. In embodiments including the optional glass handling cooling step 32, the first and/or second piece of quenched glass is further cooled to a third temperature. In one embodiment, the third temperature is a maximum temperature, wherein the third temperature is less than or equal to 90° C., alternatively less than or equal to 70° C., alternatively less than or equal to 50° C., or alternatively less than or equal to 25° C. In one such embodiment, the third temperature is a temperature at which the glass can be handled by people wearing standard protective equipment (e.g., heat resistant gloves).

With continued reference to FIGS. 2 and 3, the methods 200 and 300 may further include an optional lamination step 36. The optional lamination step 36 may be accomplished according to conventional lamination methods known in the art. In one such embodiment, a polymeric material panel 16 having substantially the same shape of the outer and inner windshield panels 12, 14 is positioned between the outer windshield panel and the inner windshield panel such that the three panels have substantially the same perimeter, followed by joining the three panels together. The three aforementioned panels may be joined together by use of an adhesive, applying pressure to the panels, and/or heat treating the panels together.

Before the first and second heating steps 24 and 44, the methods 200 and 300 may further include an optional hole drilling step 38. In one embodiment, the optional hole drilling step includes drilling a single hole in the same position or substantially the same position in each of the inner layer 12, the outer layer 14, and the polymeric material panel 16. In another embodiment, the optional hole drilling step includes drilling a plurality of holes (e.g., two holes). In further embodiments of the methods described above, the optional hole drilling step 38 is configured to form at least one hole configured to receive and support the installation of one or more windshield wipers (not shown). In an alternate embodiment, the optional hole drilling step 38 is configured to form at least one hole configured to receive and support at least one fastener (not shown) configured for the installation of the windshield onto the vehicle (not shown). In one embodiment, the optional hole drilling step 38 occurs before the optional silkscreen step 22, or alternatively occurs before the first glass heating step 24. In another embodiment, the optional hole drilling step 38 occurs before the optional silkscreen step 42, or alternatively occurs before the second glass heating step 44.

Example 1

Materials

A laminated windshield 100A for use in specialty vehicles manufactured according to the method 300 was tested. The outer panel and inner panels are 2.9 mm thick pieces of HT Green glass which were heat treated according to steps 24, 26, 28, 44, 46, and 48 of method 300. For this test, the HT Green Glass was supplied by Vitro, however it should be understood that other suppliers of HT Green Glass (e.g., Pilkington) may also be used. The polymeric material panel between the outer and inner glass panels is a 0.76 mm thick polyvinyl butyral inner layer panel. For this test, the polyvinyl butyral layer was supplied by Eastman, however it should be understood that other suppliers of polyvinyl butyral (e.g., Sekisui) may also be used. In test methods indicating a "flat sample" below, the bending steps 26 and 46 were omitted from the method 300. Unless otherwise stated, all samples were substantially square with 12-inch side lengths.

Test Methods and Results

The laminated windshield was tested according to tests outlined in ANSI Standard Z26.1-1996, which is incorporated by reference herein, unless otherwise indicated. One such example of deviations from the ANSI Standard Z26.1-1996 are tests carried out under the General Motors Worldwide Engineering Standards GMW-16500. Any differences between the testing methodologies set forth below regarding the ANSI Standard Z26.1-1996 or the GMW-16500 standard should not be understood to indicate that the tests were implemented in a different manner than the manner set forth in their respective standard unless otherwise indicated. Section 4, Item 1 of ANSI Z26.1-1996 specifies that safety glazing materials that comply with Tests 1, 2, 3, 4, 9, 12, 15, 18, and 26 are usable anywhere in a motor vehicle and are to be marked "AS1" (referred to as the "AS1 standard" herein) in accordance with Section 7 of ANSI Z26.1-1996.

Light Stability, Test 1, and Luminous Transmittance, Test 2, of Section 5 ANSI/SAE Z26.1-1996—The purpose of Test 1 is to determine the regular (parallel) luminous transmittance of the safety glazing material or multiple glazed unit before and after irradiation, thereby indicating the suitability of the safety glazing material and whether or not it is adversely affected by exposure to simulated sunlight over an extended period of time. For Test 1, the regular (parallel) luminous transmittance of the exposed specimen is reduced no more than 5%. The purpose of Test 2 is to determine the regular (parallel) luminous transmittance of safety glazing material intended for use at levels in motor vehicles requisite for driving vision. For Test 2, safety glazing materials or multiple glazed units intended for use at levels requisite for driving visibility in the motor vehicle shall show regular (parallel) luminous transmittance of not less than 70% of the light, at normal incidence, both before and after irradiation. A flat sample of the laminated windshield according to an embodiment of the invention was tested for regular parallel luminous transmittance using Illuminant A light transmission before and after irradiation from a specified UV testing cabinet, under standard operation. A QUV device configured to simulate prolonged UV exposure was used to measure light stability and luminous transmittance over a period of 100 hours to determine whether there was any change in transmittance or any discoloration in the laminated windshield after UV exposure.

Before UV exposure, the flat sample had a transmission value of 70.98%. Following UV exposure, the flat sample had a transmission value of 69.95% with only slight discoloration. In order for a laminated windshield sample to pass the light stability test, there had to be little or no visible discoloration of the sample after UV exposure. In order for a laminated windshield to pass the luminous transmittance test, Test 2, the transmittance before and after the UV exposure had to exceed 70%. Accordingly, the flat samples passed both the light stability test the luminous transmittance test and meet the AS1 standards for light transmittance set forth by the U.S. Department of Transportation for vehicular windshield glass.

Humidity Resistance, Test 3 of Section 5 ANSI/SAE Z26.1-1996—The purpose of Test 3 is to determine whether the safety glazing material will successfully withstand the effect of moisture in the atmosphere over an extended period of time. In accordance with Test 3 procedure, a flat sample of the laminated windshield was supported vertically, kept at a temperature between 120° F. and 130° F., and kept at a relative humidity at or near 100% for two weeks in a closed container over water. Following this exposure to elevated humidity, the amount of condensation on the samples was visually analyzed and the samples were visually inspected to ensure that no separation of materials occurred to determine humidity resistance.

Samples inspected following the exposure to increased humidity did not exhibit condensation, bubbles, or separation. Accordingly, the samples passed the humidity resistance test.

Boil Test, Test 4 of Section 5 ANSI/SAE Z26.1-1996—The purpose of Test 4 is to determine whether the safety glazing material will successfully withstand exposure to tropical temperatures over an extended period of time. In accordance with Test 4 procedure, a sample was immersed vertically on its edge in water at 150° F. for three minutes, then immediately transferred to boiling water for two hours. Following the boiling water, samples were visually inspected to determine whether any cracks formed within 13 mm of the edge and whether any bubbles formed within 13 mm of the edge or any cracks.

Samples inspected after being subjected to boiling water did not exhibit any crack formation nor any bubbles within 13 mm of the edge. Accordingly, the samples passed the boiling test.

Optical Deviation and Visibility Distortion (below) Test 15 of Section 5 ANSI/SAE Z26.1-1996—The purpose of this test is to measure the optical deviation and visibility distortion effects of flat or curved safety glazing materials or both. Test 15 has two parts. For optical deviation, a sample was reviewed in a semi-dark room 25 feet away from the face of an illuminated box having a light source, in this case a 25 W bulb. To comply with this requirement, in the area surveyed, there shall be no shift of the secondary image beyond a point of tangency with an inside edge of a circle. Optical deviation was visually inspected and analyzed to determine shifts in the secondary image (minutes of arc) and whether any areas of distortion exist. An ISRA Vision LabScan Screen 2D (model number 2012-925829-2) scanner is also used to provide a quick distortion check of the entire field of view.

Samples inspected did not exhibit significant optical deviation when visually inspected nor when analyzed using the ISRA Vision LabScan Screen 2D (model number 2012-925829-2) scanner (optical deviation was less than or equal to 4 minutes of arc).

Samples were also tested under static conditions using a GMW16500 4.3.4 Zebra Test wherein a slide projector is used to project a line pattern having constant thickness through the windshield, such that the projector, windshield, and white screen are all in line with each other with the windshield positioned four meters away from the projector and the white screen positioned eight meters away from the projector. An ISRA Vision LabScan Screen 2D (model number 2012-925829-2) scanner is used to map optical distortion of the sample using any distortion in the black line pattern projected through the windshield onto the white screen. Windshield samples are initially tested with the major plane of the windshield being perpendicular to the line connecting the windshield, projector, and screen, followed by testing the windshield rotated ±50 degrees about its vertical axis.

Samples were inspected to ensure that all black lines were continuous when projected onto the white screen and to ensure that none of the black lines showed a distortion when projected onto the white screen of more than ±5 mm of the paint band, more than ±4 mm within any 25 $cm^2$ portion, and more than 3 mm in the remaining area of the Day Light Opening (DLO). All samples tested satisfied the requirements of the GMW 16500 4.3.4 standard.

Visibility Distortion Test of Test 15 of Section 5 ANSI/SAE Z26.1-1996-A sample was reviewed in a semi-dark room having a projector capable of projecting a sharply defined image on a screen located 25 feet away. The sample was placed between the projector and the screen, close to and as nearly parallel with the screen as was possible. The sample was initially placed near to the screen in line with the center of the projected image, and the screen was visually inspected for light and dark patches and inspected using the ISRA Vision LabScan Screen 2D (model number 2012-925829-2) scanner for visual distortion. This test was repeated by advancing the sample closer to the light source in increments of 5 inches until it is confirmed that no light or dark patches exist when positioned at least 25 inches away from the screen.

Samples inspected did not exhibit light or dark patches on the screen at distances less than or equal to 25 inches away from the screen. Distortion of the image within the inside edge of the 4 arc minute circle was less than or equal to 150 mdpt, while there was no distortion within the circle itself.

Samples were further tested for optical distortion using the GMW16500 4.3.2 Dynamic Windshield evaluation standard. Samples are visually inspected during operation of the vehicle to note whether and where optical distortion occurs on the windshield. Samples pass visual inspection during operation of the vehicle if there is only light optical disturbance that only a critical consumer would object to. All samples passed this visual inspection.

Abrasion Resistance, Test 18 of Section 5 ANSI/SAE Z26.1-1996—The purpose of this test is to determine whether safety glazing material, as mounted in the vehicle, has a certain minimum resistance to abrasion. A sample was subjected to a Taber Industries abrasing device (model number 5130) for 1000 cycles using a CS-10F wheel. The light scattered by the sample (haze) was assessed before and after abrasion to determine whether abrasion increased haze by more than the 2% allowable maximum abrasion increase.

The average haze of the samples before abrasion was 0.22% whereas the average haze after abrasion was 1.27%, resulting in a net haze of 1.05%. This net haze fell within the acceptable range for abrasion resistance for the samples.

Impact, Test 9, Dart Drop, 30 ft of Section 5 ANSI/SAE Z26.1-1996—The purpose of this test is to determine the behavior of the safety glazing material under impact from a small, hard object. A sample was subjected to air at an elevated temperature between 70° F. and 85° F. for four hours. Following this elevated temperature exposure, the samples were horizontally supported in a steel frame and subjected to an impact test wherein a seven-ounce steel dart was dropped once from a height of 30 feet within an inch of the center of the sample. Following the impact test, the sample was visually inspected to determine whether any pieces of the sample detached from the glass other than at the impact area and whether the steel dart was able to pass through the glass.

The tested sample had no detached pieces and did not allow passage of the dart through the sample. Accordingly, the sample passed this impact test.

Impact, Test 12, Half Pound Ball Drop, 30 ft of Section 5 ANSI/SAE Z26.1-1996—The purpose of this test is to determine whether the safety glazing material has a certain minimum strength and whether it is properly made. A sample was subjected to air at an elevated temperature between 70° F. and 85° F. for four hours. Following this elevated temperature exposure, the samples were horizontally supported in a steel frame and subjected to an impact test wherein a half pound steel sphere was dropped once from a height of 30 feet within an inch of the center of the sample. Following the impact test, the sample was visually inspected to determine whether any pieces detached from the glass, the area of any detached pieces, and whether the steel sphere was able to pass through the glass.

The tested sample had no detached pieces and did not allow passage of the steel sphere through the sample. Accordingly, the sample passed this impact test.

Penetration Resistance, Test 26 of Section 5 ANSI/SAE Z26.1-1996—The purpose of this test is to determine whether the safety glazing material has satisfactory penetration resistance. A sample was subjected to air at an elevated temperature between 70° F. and 85° F. for at least 4 hours. Following this elevated temperature exposure, the samples were horizontally supported in a steel frame and subjected to an impact test wherein a five-pound steel sphere was dropped once from a height of 12 feet within an inch of the center of the sample. During a 5 second interval after impact of the ball, the ball was monitored for passage through the sample either by puncture of the sample or by fracture of the sample into relatively large pieces that subsequently fold aside to permit passage of the ball.

While the glass did fracture as expected, samples tested were able to resist not only penetration of the steel sphere through the sample, but also delamination.

While specific embodiments have been described in considerable detail to illustrate the disclosed invention, the description is not intended to restrict or in any way limit the scope of the appended claims to such detail. The various features discussed herein may be used alone or in any combination. Additional advantages and modifications will readily appear to those skilled in the art. The invention in its broader aspects is therefore not limited to the specific details, representative apparatus and methods and illustrative examples shown and described. Accordingly, departures may be made from such details without departing from the scope of the general inventive concept.

What is claimed is:

1. A laminated vehicle windshield comprising:

an outer windshield panel comprising heat-strengthened glass;

an inner windshield panel comprising heat-strengthened glass; and a polymeric material panel extending from direct contact with the outer windshield panel to direct contact with the inner windshield panel, wherein the heat-strengthened glass of the outer windshield panel and/or the inner windshield panel has a surface compression greater than or equal to 3,500 PSI and less than or equal to 7,500 PSI, wherein the outer windshield panel and/or the inner windshield panel having the surface compression greater than or equal to 3,500 PSI and less than or equal to 7,500 PSI has a thickness greater than or equal to 1.8 mm and less than or equal to 4 mm, and wherein the polymeric material panel consists essentially of vinyl, polyvinyl butyral, thermoplastic polyurethane, ethylene-vinyl acetate, or a combination thereof.

2. The windshield of claim 1, wherein the surface compression is greater than or equal to 3,500 PSI and less than or equal to 5,500 PSI.

3. The windshield of claim 1, wherein the laminated vehicle windshield is bent.

4. The windshield of claim 1, wherein the laminated windshield has at least one hole.

5. The windshield of claim 4, wherein each of the at least one hole is configured to receive a windshield wiper.

6. The windshield of claim 4, wherein each of the at least one hole is configured to receive at least one fastener configured to mount the windshield to a vehicle.

7. The windshield of claim 4, wherein each of the at least one hole is configured to enable ventilation of the windshield.

8. The windshield of claim 1, wherein the windshield is configured for use in a utility terrain vehicle.

9. The windshield of claim 1, wherein the windshield has a thickness greater than or equal to 4 mm and less than or equal to 10 mm.

10. The windshield of claim 1, wherein the windshield has a thickness substantially equal to 6.16 mm.

11. The windshield of claim 1, wherein the windshield has a thickness substantially equal to 6.55 mm.

12. The windshield of claim 1, wherein the outer windshield panel and the inner windshield panel each comprise heat-strengthened glass having a surface compression greater than or equal to 3,500 PSI and less than or equal to 7,500 PSI.

13. The windshield of claim 1 further comprising a silk screen portion.

14. The windshield of claim 13, wherein the silkscreen portion is positioned on an interior facing side of the outer windshield panel.

15. The windshield of claim 13, wherein the silkscreen portion is positioned on an interior facing side of the inner windshield panel.

16. The windshield of claim 1, wherein the surface compression is greater than or equal to 3,500 PSI and less than or equal to 5,000 PSI.

17. The windshield of claim 12, wherein each of the outer windshield panel and the inner windshield panel has a thickness greater than or equal to 1.8 mm and less than or equal to 4 mm.

18. The windshield of claim 17, wherein the laminated vehicle windshield, after having been held at a temperature from 70° F. to 85° F. for 4 hours is capable of withstanding impact from a five-pound steel sphere dropped once from a height of 12 feet within an inch of a center of the laminated vehicle windshield supported in a steel frame, such that during a 5 second interval after impact, the laminated vehicle windshield does not permit the steel sphere to pass through.

19. The windshield of claim 18, wherein when a line pattern having constant thickness is projected through the laminated windshield with a slide projector, wherein the slide projector, the laminated windshield, and a white screen are all in line with each other and with the laminated windshield positioned four meters away from the projector and the white screen positioned eight meters away from the projector, all black lines were continuous when projected onto the white screen and none of the black lines were distorted by more than ±5 mm of the paint band, were distorted by more than ±4 mm within any 25 cm2 portion, and were distorted by more than 3 mm in the remaining area of the Day Light Opening (DLO).

20. The windshield of claim 18, wherein in a semi-dark room with a projector positioned 25 feet from a screen, when the laminated windshield is placed between the projector and the screen, close to and as nearly parallel with the screen as was possible and initially placed near to the screen in line with a center of the projected image, is moved at intervals of 5 inches toward the projector, and a projected image on the screen is inspected with an ISRA Vision LabScan Screen 2D at each interval, no light or dark patches exist when the laminated windshield is positioned at a distance less than or equal to 25 inches from the screen and distortion of the projected image within an inside edge of a 4 arc minute circle is less than or equal to 150 mdpt with no distortion within the 4 arc minute circle.

21. The windshield of claim 1, wherein the outer windshield panel and the inner windshield panel each comprise heat-strengthened glass having a surface compression greater than or equal to 3,500 PSI and less than or equal to 5,500 PSI.

22. The windshield of claim 21, wherein each of the outer windshield panel and the inner windshield panel has a thickness greater than or equal to 1.8 mm and less than or equal to 4 mm.

23. The windshield of claim 22, wherein the laminated vehicle windshield, after having been held at a temperature from 70° F. to 85° F. for 4 hours is capable of withstanding impact from a five-pound steel sphere dropped once from a height of 12 feet within an inch of a center of the laminated vehicle windshield supported in a steel frame, such that during a 5 second interval after impact, the laminated vehicle windshield does not permit the steel sphere to pass through.

24. The windshield of claim 23, wherein when a line pattern having constant thickness is projected through the laminated windshield with a slide projector, wherein the slide projector, the laminated windshield, and a white screen are all in line with each other and with the laminated windshield positioned four meters away from the projector and the white screen positioned eight meters away from the projector, all black lines were continuous when projected onto the white screen and none of the black lines were distorted by more than ±5 mm of the paint band, were distorted by more than ±4 mm within any 25 cm2 portion, and were distorted by more than 3 mm in the remaining area of the Day Light Opening (DLO).

25. The windshield of claim 23, wherein in a semi-dark room with a projector positioned 25 feet from a screen, when the laminated windshield is placed between the projector and the screen, close to and as nearly parallel with the screen as was possible and initially placed near to the screen in line with a center of the projected image, is moved at intervals of 5 inches toward the projector, and a projected image on the screen is inspected with an ISRA Vision LabScan Screen 2D at each interval, no light or dark patches exist when the laminated windshield is positioned at a distance less than or equal to 25 inches from the screen and distortion of the projected image within an inside edge of a 4 arc minute circle is less than or equal to 150 mdpt with no distortion within the 4 arc minute circle.

26. The windshield of claim 1, wherein the outer windshield panel and the inner windshield panel each comprise heat-strengthened glass having a surface compression greater than or equal to 3,500 PSI and less than or equal to 5,000 PSI.

27. The windshield of claim 26, wherein each of the outer windshield panel and the inner windshield panel has a thickness greater than or equal to 1.8 mm and less than or equal to 4 mm.

28. The windshield of claim 27, wherein the laminated vehicle windshield, after having been held at a temperature from 70° F. to 85° F. for 4 hours is capable of withstanding impact from a five-pound steel sphere dropped once from a height of 12 feet within an inch of a center of the laminated vehicle windshield supported in a steel frame, such that during a 5 second interval after impact, the laminated vehicle windshield does not permit the steel sphere to pass through.

29. The windshield of claim 28, wherein when a line pattern having constant thickness is projected through the laminated windshield with a slide projector, wherein the slide projector, the laminated windshield, and a white screen are all in line with each other and with the laminated windshield positioned four meters away from the projector and the white screen positioned eight meters away from the projector, all black lines were continuous when projected onto the white screen and none of the black lines were distorted by more than ±5 mm of the paint band, were distorted by more than ±4 mm within any 25 cm2 portion, and were distorted by more than 3 mm in the remaining area of the Day Light Opening (DLO).

30. The windshield of claim 28, wherein in a semi-dark room with a projector positioned 25 feet from a screen, when the laminated windshield is placed between the projector and the screen, close to and as nearly parallel with the screen as was possible and initially placed near to the screen in line with a center of the projected image, is moved at intervals of 5 inches toward the projector, and a projected image on the screen is inspected with an ISRA Vision LabScan Screen 2D at each interval, no light or dark patches exist when the laminated windshield is positioned at a distance less than or equal to 25 inches from the screen and distortion of the projected image within an inside edge of a 4 arc minute circle is less than or equal to 150 mdpt with no distortion within the 4 arc minute circle.

31. A laminated vehicle windshield comprising:

an outer windshield panel;

an inner windshield panel; and a polymeric material panel positioned extending from direct contact with the outer windshield panel to direct contact with the inner windshield panel and consisting essentially of vinyl, polyvinyl butyral, thermoplastic polyurethane, ethylene-vinyl acetate, or a combination thereof, wherein each of the outer windshield panel and the inner windshield panel comprises heat-strengthened glass and the laminated vehicle windshield is bent, and wherein the laminated vehicle windshield, after having been held at a temperature from 70° F. to 85° F. for 4 hours is capable of withstanding impact from a five-pound steel sphere dropped once from a height of 12 feet within an inch of a center of the laminated vehicle windshield supported in a steel frame, such that during a 5 second interval after impact, the laminated vehicle windshield does not permit the steel sphere to pass through.

32. The windshield of claim 31, wherein the heat-strengthened glass has a surface compression greater than or equal to 3,500 PSI and less than or equal to 7,500 PSI.

33. The windshield of claim 31, wherein the heat-strengthened glass has a surface compression greater than or equal to 3,500 PSI and less than or equal to 5,500 PSI.

34. The windshield of claim 31, wherein the heat-strengthened glass has a surface compression greater than or equal to 3,500 PSI and less than or equal to 5,000 PSI.

35. The windshield of claim 32, wherein the outer windshield panel and/or the inner windshield panel has a thickness greater than or equal to 1.8 mm and less than or equal to 4 mm.

36. The windshield of claim 32, wherein each the outer windshield panel and the inner windshield panel has a thickness greater than or equal to 1.8 mm and less than or equal to 4 mm.

37. The windshield of claim 1, wherein the laminated vehicle windshield maintains a regular parallel luminous transmittance sufficient to be used as a windshield of a vehicle.

38. The windshield of claim 1, wherein the windshield maintains at least 70% regular parallel luminous transmittance.

39. The windshield of claim 38, wherein the polymeric material panel has a thickness greater than 0.5 mm and less than or equal to 1.5 mm.

40. The windshield of claim 39, wherein the laminated vehicle windshield has a haze of less than a 2% allowable maximum abrasion increase following 1000 cycles using a CS-10F wheel.

41. The windshield of claim 1, wherein the windshield maintains at least 70% regular parallel luminous transmittance at operating temperatures up to 150° F.

42. The windshield of claim 1, wherein the laminated vehicle windshield maintains no more than 5% reduction in luminous transmittance after exposure to UV radiation at about 44° C. for 100 hours.

43. The windshield of claim 1, wherein the laminated vehicle windshield includes a mark of AS1 on at least one of the outer windshield panel and the inner windshield panel.

44. The windshield of claim 31, wherein the windshield maintains at least 70% regular parallel luminous transmittance.

45. The windshield of claim 44, wherein the polymeric material panel has a thickness greater than 0.5 mm and less than or equal to 1.5 mm.

46. The windshield of claim 45, wherein the laminated vehicle windshield has a haze of less than a 2% allowable maximum abrasion increase following 1000 cycles using a CS-10F wheel.

47. A vehicle for transporting one or more people, including a driver, the vehicle comprising:

a laminated windshield in front of the driver and through which the driver is able to see from within the vehicle, the laminated windshield comprising:

an outer windshield panel comprising heat-strengthened glass;

an inner windshield panel comprising heat-strengthened glass; and a polymeric material panel extending from direct contact with the outer windshield panel to direct contact with the inner windshield panel, wherein the heat-strengthened glass of the outer windshield panel and/or the inner windshield panel has a surface compression greater than or equal to 3,500 PSI and less than or equal to 7,500 PSI, wherein the outer windshield panel and/or the inner windshield panel having the surface compression greater than or equal to 3,500 PSI and less than or equal to 7,500 PSI has a thickness greater than or equal to 1.8 mm and less than or equal to 4 mm, and wherein the polymeric material panel consists essentially of vinyl, polyvinyl butyral, thermoplastic polyurethane, ethylene-vinyl acetate, or a combination thereof.

48. The vehicle of claim 47, wherein the laminated vehicle windshield maintaining a regular parallel luminous transmittance sufficient for the driver to see through the laminated windshield while driving the vehicle.

49. The vehicle of claim 47, wherein the laminated vehicle windshield includes a mark of AS1 on at least one of the outer windshield panel and the inner windshield panel.

* * * * *